(12) United States Patent  
Thompson et al.

(10) Patent No.: US 8,511,049 B2
(45) Date of Patent: *Aug. 20, 2013

(54) SELF-LEVELING FOUR-BAR LINKAGE FOR SUSPENDING A HEADER OF AN AGRICULTURAL IMPLEMENT

(75) Inventors: Kent L. Thompson, Otley, IA (US); Shane A. Bollinger, Leighton, IA (US); Rustin V. Bentzinger, Pella, IA (US)

(73) Assignee: Vermeer Manufacturing Co., Pella, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,686

(22) Filed: Sep. 5, 2012

(65) Prior Publication Data

US 2012/0324854 A1 Dec. 27, 2012

Related U.S. Application Data

(60) Continuation of application No. 13/365,672, filed on Feb. 3, 2012, which is a continuation of application No. 13/116,639, filed on May 26, 2011, now Pat. No. 8,118,533, which is a continuation of application No. 12/760,081, filed on Apr. 14, 2010, now Pat. No. 7,958,707, which is a division of application No. 11/927,866, filed on Oct. 30, 2007, now Pat. No. 7,726,109.

(51) Int. Cl.
*A01D 34/00* (2006.01)

(52) U.S. Cl.
USPC .......................................... 56/15.8; 172/439

(58) Field of Classification Search
USPC ................. 172/439, 451, 245, 272, 273, 468, 172/448, 443, 319; 37/468, 231; 280/460.1, 280/461.1, 455.1; 56/15.8, 16.4 R, 365, 56/218

See application file for complete search history.

(56) References Cited

U.S. PATENT DOCUMENTS

| | | | | |
|---|---|---|---|---|
| 3,312,290 | A | * | 4/1967 | Abbott ........................... 172/451 |
| 3,432,184 | A | * | 3/1969 | Tweedy ......................... 172/272 |
| 3,517,491 | A | | 6/1970 | Harer |
| 3,592,106 | A | | 7/1971 | Baughman |
| 3,633,679 | A | | 1/1972 | Dahlberg |

(Continued)

FOREIGN PATENT DOCUMENTS

| | | |
|---|---|---|
| DE | 4013591 | 11/1991 |
| EP | 456900 | 11/1991 |
| EP | 0642731 | 3/1995 |
| FR | 2559989 | 8/1985 |

OTHER PUBLICATIONS 1 sheet showing a New Holland—Section 8 Hydraulic Cylinder.

(Continued)

*Primary Examiner* — Árpád Fábián-Kovács
(74) *Attorney, Agent, or Firm* — Sturm & Fix LLP

(57) ABSTRACT

A suspension system for agricultural implements having at least one floating head using a four-bar linkage and permitting the floating head to accommodate variations in ground surface elevation in a lateral or transverse direction. By permitting the floating head to float, a more consistent cutting height is realized when ground surface elevation varies in a transverse direction. A main frame is provided to which the ground engaging wheels are attached. A sub-frame is connected to the main frame via the four-bar linkage. The sub-frame is pivotally attached to the arms of the four-bar linkage by spherical bearings.

29 Claims, 14 Drawing Sheets

(56) References Cited

U.S. PATENT DOCUMENTS

| | | | |
|---|---|---|---|
| 3,722,915 A * | 3/1973 | Gail | 172/439 |
| 3,751,889 A | 8/1973 | Overesch | |
| 4,083,411 A | 4/1978 | van der Lely | |
| 4,177,627 A | 12/1979 | Cicci | |
| 4,207,802 A | 6/1980 | Homuth | |
| 4,216,975 A | 8/1980 | Schafer | |
| 4,218,865 A | 8/1980 | Chaumont | |
| 4,239,085 A | 12/1980 | Venable | |
| 4,286,423 A | 9/1981 | Caldwell | |
| 4,330,982 A | 5/1982 | Vissers | |
| 4,343,138 A | 8/1982 | Neuerburg | |
| 4,345,873 A | 8/1982 | Wymore | |
| 4,351,397 A | 9/1982 | Winker | |
| 4,431,207 A * | 2/1984 | Langenfeld et al. | 280/416.2 |
| 4,477,101 A * | 10/1984 | Nilsson et al. | 172/272 |
| 4,506,609 A | 3/1985 | Fuss | |
| 4,518,043 A | 5/1985 | Anderson | |
| 4,599,852 A | 7/1986 | Kerber | |
| 4,676,053 A | 6/1987 | Pruitt | |
| 4,719,742 A | 1/1988 | Ermacora | |
| 4,723,396 A | 2/1988 | Ermacora | |
| 4,723,401 A | 2/1988 | Webster | |
| 4,724,661 A | 2/1988 | Blakeslee | |
| 4,848,069 A | 7/1989 | Ermacora | |
| 4,858,698 A | 8/1989 | Williamson | |
| 4,903,781 A * | 2/1990 | Smit | 172/316 |
| 4,970,848 A | 11/1990 | Neuerburg | |
| 5,060,462 A | 10/1991 | Heifer | |
| 5,094,063 A | 3/1992 | Wattron | |
| 5,107,663 A | 4/1992 | Wattron | |
| 5,157,905 A | 10/1992 | Talbot | |
| 5,193,330 A | 3/1993 | Nusser | |
| 5,203,154 A | 4/1993 | Lesher | |
| 5,337,544 A | 8/1994 | Lauritsen | |
| 5,357,737 A | 10/1994 | Ermacora | |
| 5,417,042 A | 5/1995 | Walch | |
| 5,566,535 A | 10/1996 | Pruitt | |
| 5,566,536 A | 10/1996 | Krafka | |
| 5,697,454 A | 12/1997 | Wilcox et al. | |
| 5,737,859 A | 4/1998 | Tardif | |
| 5,738,316 A | 4/1998 | Sweere | |
| 5,743,020 A | 4/1998 | Sheldon | |
| 5,743,339 A * | 4/1998 | Alexander, III | 172/272 |
| 5,918,451 A | 7/1999 | Vonesch | |
| 5,950,735 A * | 9/1999 | Godbersen | 172/439 |
| 5,992,133 A | 11/1999 | Walch | |
| 6,035,478 A | 3/2000 | Miller | |
| 6,055,800 A | 5/2000 | Walch | |
| 6,076,341 A | 6/2000 | Gummerson | |
| 6,085,501 A | 7/2000 | Walch | |
| 6,125,619 A | 10/2000 | Wolff | |
| 6,186,043 B1 | 2/2001 | Callies | |
| 6,238,170 B1 | 5/2001 | Pingry | |
| 6,250,055 B1 | 6/2001 | Franet | |
| 6,269,619 B1 | 8/2001 | Walch | |
| 6,308,504 B1 | 10/2001 | Walch | |
| 6,343,661 B1 | 2/2002 | Thompson | |
| 6,345,490 B1 | 2/2002 | Wolff | |
| 6,347,504 B1 | 2/2002 | Willibald | |
| 6,360,516 B1 | 3/2002 | Harkcom | |
| 6,381,935 B1 | 5/2002 | Wattron | |
| 6,478,094 B2 * | 11/2002 | Alexander et al. | 172/439 |
| 6,588,513 B1 | 7/2003 | Gustafson | |
| 6,655,118 B1 | 12/2003 | Thompson | |
| 6,662,540 B1 | 12/2003 | Harkcom | |
| 6,666,010 B2 | 12/2003 | Beaufort | |
| 6,698,113 B1 | 3/2004 | Jones | |
| 6,758,031 B2 | 7/2004 | Franet | |
| 6,782,680 B2 | 8/2004 | Viaud | |
| 6,837,033 B2 | 1/2005 | Schlesser | |
| 6,845,603 B1 | 1/2005 | Stephenson | |
| 6,907,719 B2 | 6/2005 | Ligouy | |
| 6,912,832 B1 | 7/2005 | Thompson et al. | |
| 7,024,844 B2 | 4/2006 | Schlesser | |
| 7,047,714 B1 | 5/2006 | Stephenson | |
| 7,086,214 B2 | 8/2006 | Thompson et al. | |
| 7,353,628 B2 * | 4/2008 | Potak | 37/231 |
| 7,370,460 B1 | 5/2008 | Philips | |
| 7,596,935 B2 | 10/2009 | Bollinger | |
| 7,617,882 B1 * | 11/2009 | Street | 172/817 |
| 7,658,056 B2 | 2/2010 | Thompson | |
| 7,726,109 B2 | 6/2010 | Thompson | |
| 7,958,707 B2 | 6/2011 | Thompson | |
| 7,996,794 B2 | 8/2011 | Kobayashi | |
| 8,118,533 B2 * | 2/2012 | Thompson et al. | 414/550 |
| 2003/0221401 A1 | 12/2003 | Ligouy | |
| 2004/0035288 A1 | 2/2004 | Hawthorne | |
| 2005/0077714 A1 | 4/2005 | Mulhern | |
| 2005/0206149 A1 | 9/2005 | Mulhern | |
| 2005/0279071 A1 | 12/2005 | Thompson et al. | |
| 2006/0248870 A1 | 11/2006 | Geiser | |
| 2009/0107096 A1 | 4/2009 | Thompson et al. | |
| 2009/0107097 A1 * | 4/2009 | Thompson et al. | 56/15.8 |
| 2010/0132325 A1 * | 6/2010 | Thompson et al. | 56/15.3 |
| 2010/0192534 A1 * | 8/2010 | Thompson et al. | 56/15.8 |
| 2011/0047948 A1 | 3/2011 | Thompson | |
| 2011/0219739 A1 * | 9/2011 | Thompson et al. | 56/15.8 |
| 2012/0131893 A1 * | 5/2012 | Thompson et al. | 56/15.8 |

OTHER PUBLICATIONS 7 sheets, entitled "Late Model Mustang Suspension Basics" showing automotive suspensions, document downloaded at http://www.miracerros.com/mustang/t suspension htm Date, Feb. 20, 2008.

A 36-page brochure entitled LELY High-Tech in Agriculture Disc Mowers—SPLENDIMO. Relevant pages are 32-36 showing the Splendimo PC; Also a 1-page drawing that shows the same Lely Splendimo Machine.

* cited by examiner

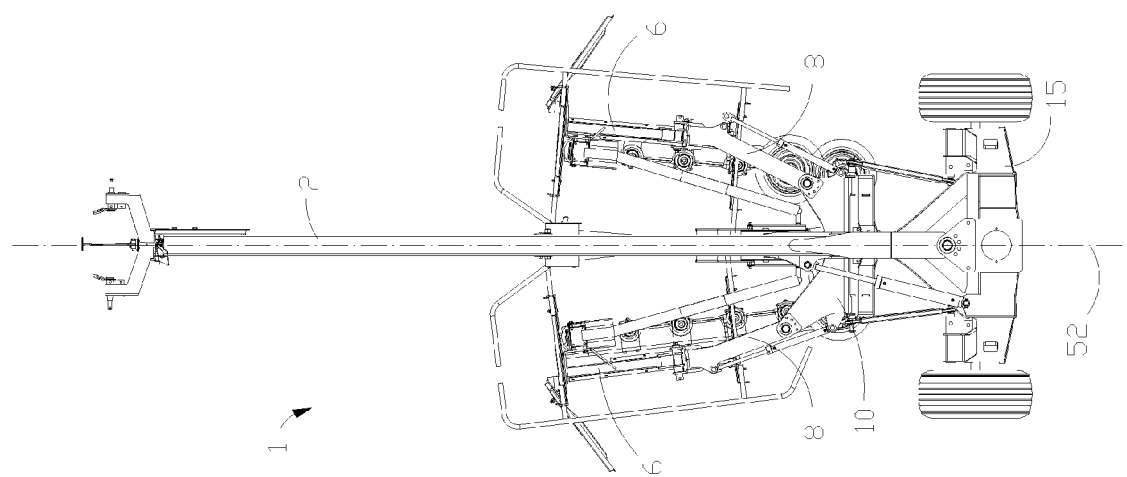

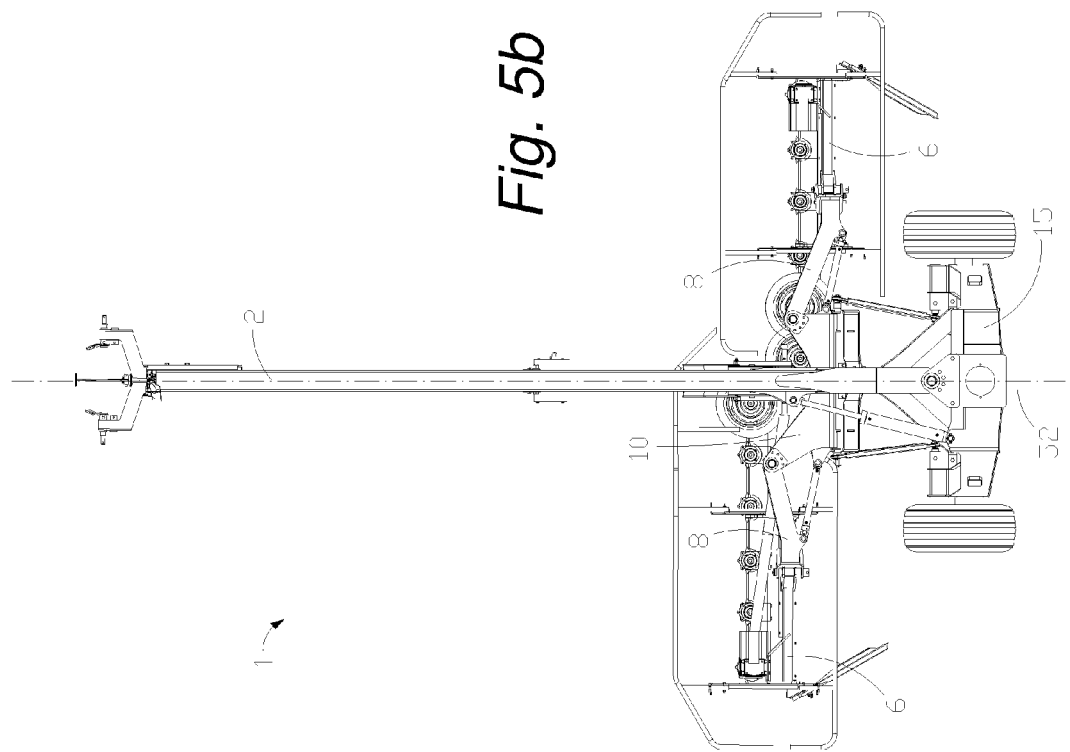

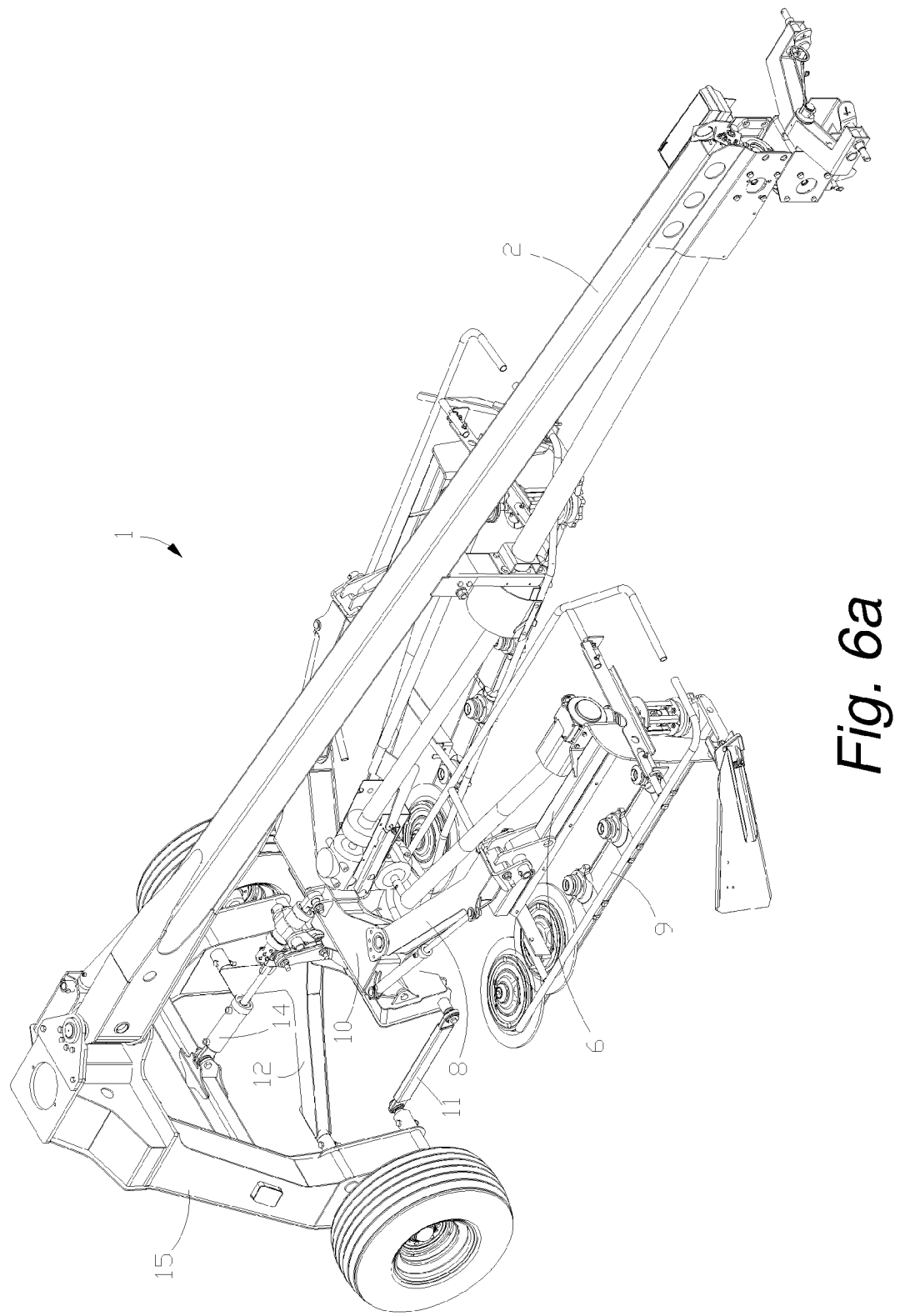

SELF-LEVELING FOUR-BAR LINKAGE FOR SUSPENDING A HEADER OF AN AGRICULTURAL IMPLEMENT

CROSS REFERENCE TO RELATED APPLICATIONS

This application is a Continuation of U.S. Ser. No. 13/365,672 filed Feb. 3, 2012 entitled Improved Self-Leveling Four-Bar Linkage for Suspending a Header of an Agricultural Implement, which is a Continuation of U.S. Ser. No. 13/116,639 filed May 26, 2011, now U.S. Pat. No. 8,118,533 issued Feb. 21, 2012 entitled Narrow Four-Bar Linkage for Suspending a Wide Header for an Agricultural Implement, which is a Continuation of U.S. Ser. No. 12/760,081 filed Apr. 14, 2010, now U.S. Pat. No. 7,958,707 issued Jun. 14, 2011, entitled Four-Bar Linkage For Suspending A Header For An Agricultural Implement, which is a Divisional of U.S. Ser. No. 11/927,866 filed Oct. 30, 2007, now U.S. Pat. No. 7,726,109 issued Jun. 1, 2010 entitled Four-Bar Linkage for Suspending a Header for an Agricultural Implement and are hereby incorporated by reference herein in their entirety, claiming priority therefrom.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to an agricultural implement, including a floating work tool. More particularly, the present invention relates to an improved suspension system for agricultural implements having one or more floating work tools.

2. Background Art

Ground on which forage crops or other foliage needing mowing is grown is rarely smooth. Such ground essentially always varies in level both in a direction of travel of the mowing machine or harvester, and in a transverse or lateral direction.

Mowing machines having a variable height cutter have been available for decades. Mounted sickle mowers used in the mid-twentieth century could be raised and lowered using the tractor lift system. Towed mowers, by necessity, were made so the header could be raised and lowered, at least between an operating position and a transport position.

In U.S. Pat. No. 6,250,055, a mower header suspension system is disclosed. The suspension system comprises a pair of lower linkage arms and a single upper suspension arm. Provision for changes in ground elevation in the direction of travel is disclosed.

Disclosed in U.S. Pat. No. 6,055,800 is a mower header suspension system providing a variable header angle compared to the longitudinal direction. The disclosed mechanism comprises two lower linkage arms and a single upper linkage arms.

The above described header suspension systems provide for changing the height of cut relative to the ground surface supporting the ground engaging wheels of the tractor or towed mower, but do not provide for a consistent cut height on ground that varies in level both in the direction of travel and in the lateral direction.

There is, therefore, a need for a method and apparatus for providing flexibility in header position to permit the header to raise and lower as ground elevation changes, and to rotate to adjust to lateral variations in ground surface levels.

BRIEF SUMMARY OF THE INVENTION

An object of the present invention is to provide a suspension system that enables a header or work tool of a towed implement to be raised and lowered, and also permit the header or work tool to follow the variable ground contour, resulting in a consistent cut height despite the variability of the ground elevation.

For the purposes of this document, including the claims, a towed implement is an implement with ground engaging means, for example wheels, independent of the source of motive power, for example a farm tractor; additionally, the towed implement has a frame or other component that may be raised and lowered relative to the ground engaging means independent of a lift, such as a standard three-point or two-point lift system of the source of motive power. Therefore, a towed vehicle is pulled by the source of motive power and my use the source of motive power's hydraulic system for raising and lowering, but does not make use of lift arms usually attached to a farm tractor.

The mower comprises two integrated frames connected by two sets of linkages to create a four-bar linkage. The two sets of linkages are maintained parallel to one another, so that the two frames are maintained at a known orientation to one another as the header is raised and lowered.

The upper linkage set comprises two "bars," oriented at angles with respect to a longitudinal axis of the mower such that they connect to the sub-frame at points nearer the longitudinal axis than those points at which they connect to the main frame.

In contrast, the lower links are angled such that they connect to the sub-frame at points farther from the longitudinal axis than those points at which the lower links connect to the main frame.

Spherical bearings are used to connect each independent bar of the lower linkage set to the main frame and to the sub-frame. As well, spherical bearings are also used to connect the upper linkage bars to the sub-frame. The upper linkage bars are pivotally attached to the main frame by cylindrical bearings.

In a first embodiment, the upper linkage bars are permanently connected to one another where the upper linkage bars converge at the sub-frame, and are subsequently connected to the sub-frame using a single spherical bearing. In an alternative embodiment, the two bars are not directly connected to one another, but are pivotally connected to the sub-frame by independent spherical bearings in the same manner as the lower linkage bars.

The linkage arrangement herein described allows the sub-frame the ability to rotate about an axis of rotation parallel to the longitudinal axis of the mower. This ability is called "float" and refers to the capability of the mower to adjust itself automatically to a ground slope perpendicular to the direction of travel.

Other objects, advantages and novel features of the present invention will become apparent from the following detailed

BRIEF DESCRIPTION OF THE DRAWINGS

FIG. 5a is a top plan view of the sub-frame in a transport configuration showing both arms rotated inward toward the longitudinal axis;

FIG. 5b is a top plan view of the sub-frame in an operating configuration showing both arms 8 rotated outward from the longitudinal axis;

FIG. 6a is an isometric view of the mower in transport configuration;

DETAILED DESCRIPTION OF THE INVENTION

Figure 1A:
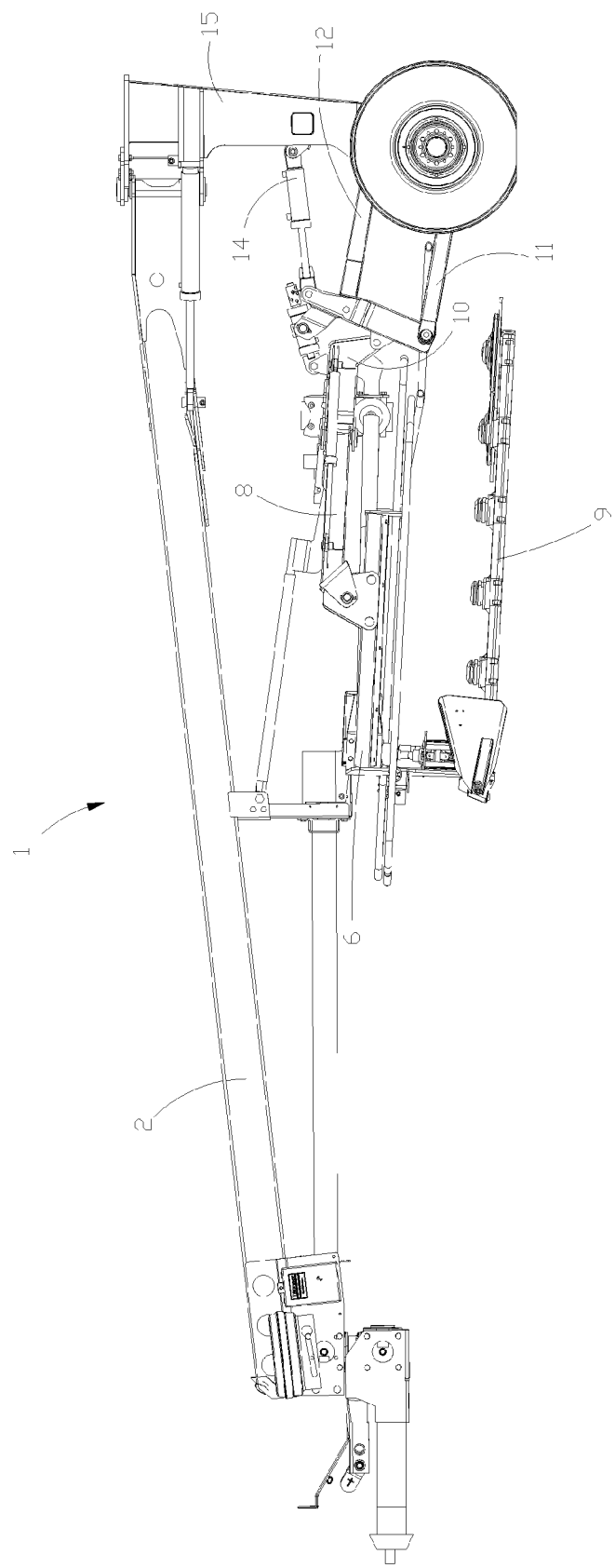
FIG. 1a is a side elevation of a mower machine in a transport configuration.
Figure 1B:
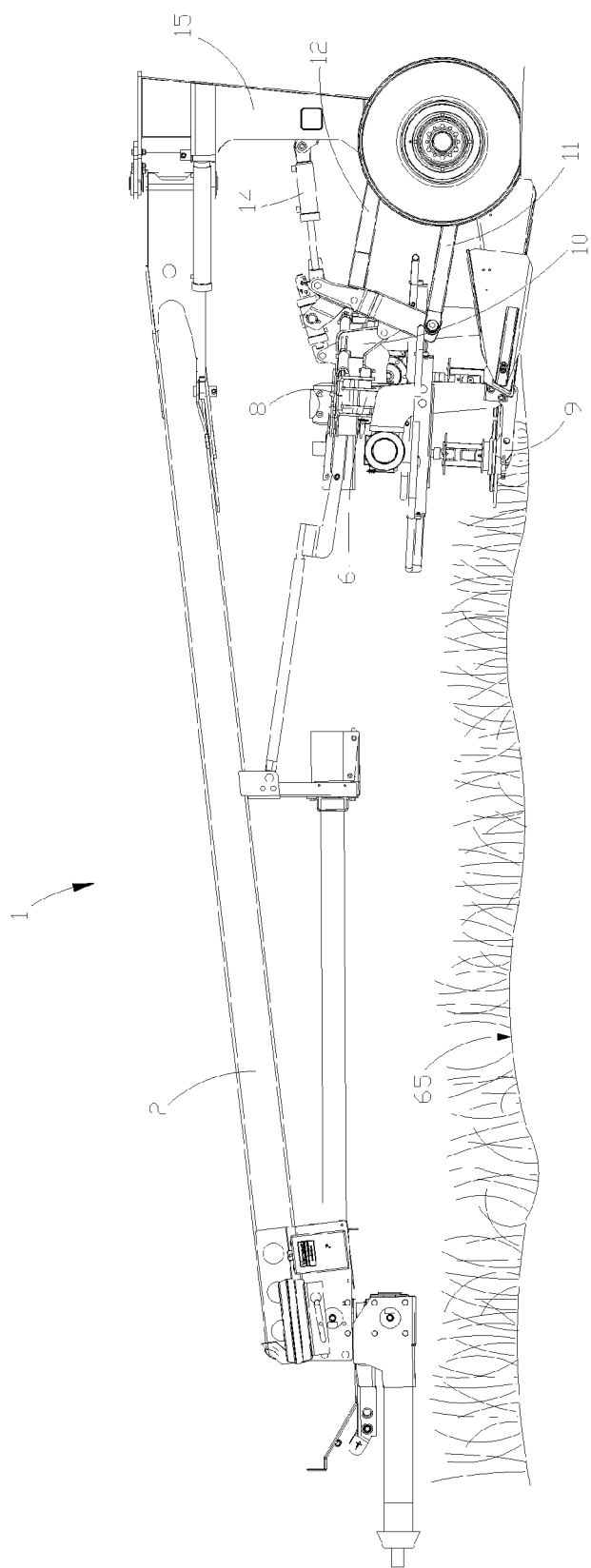
FIG. 1b is a side elevation of the mower machine in an operating configuration.
Figure 2:
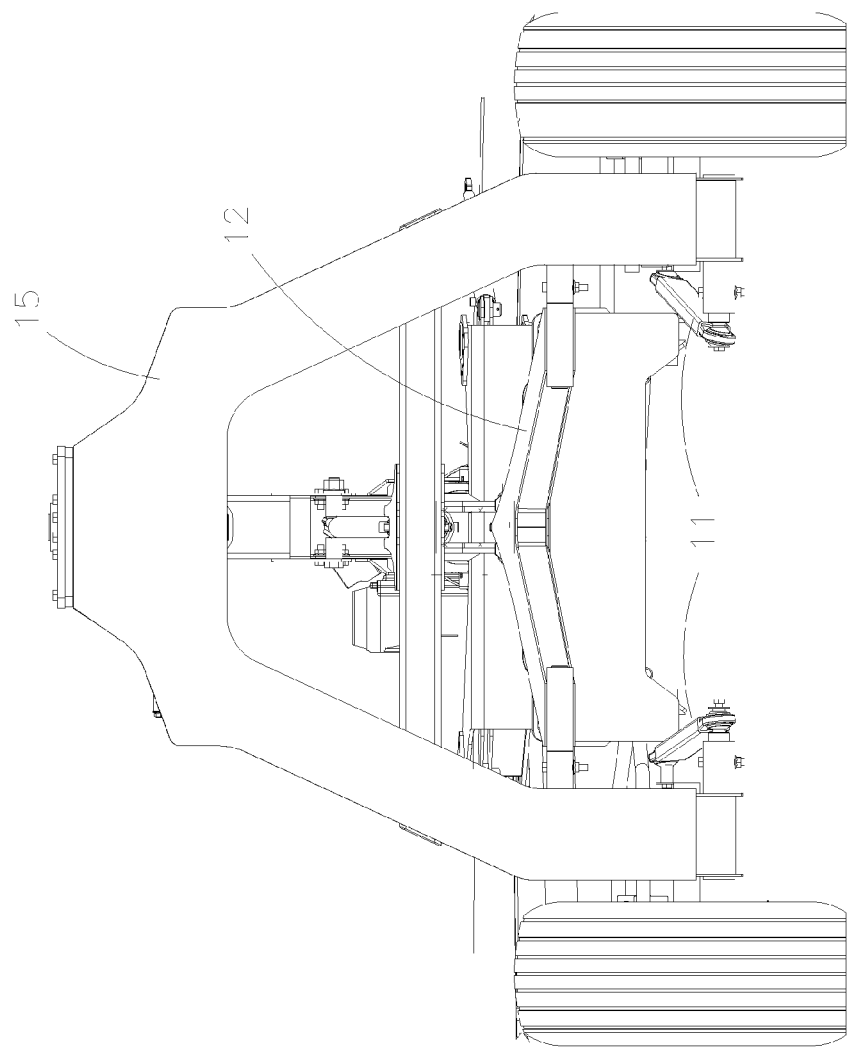
FIG. 2 is a rear elevation view of the mower showing a four-bar linkage system arrangement.
Figure 4:
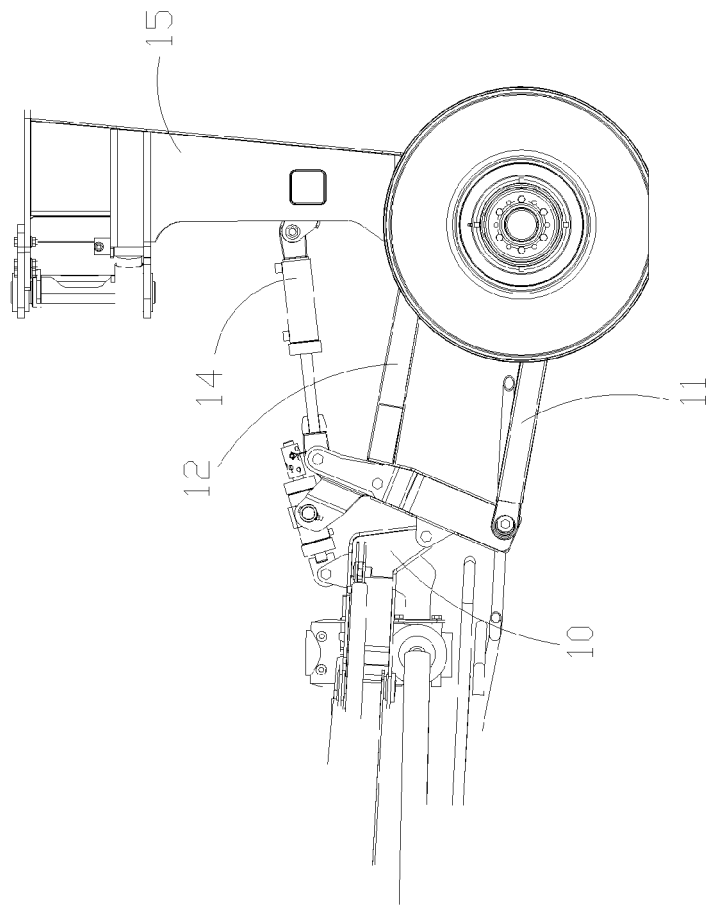
FIG. 4 is a left side elevation view of the rear of the mower showing the pivot point in the sub-frame about which the cutter bar pitch is controlled.
Figure 3:
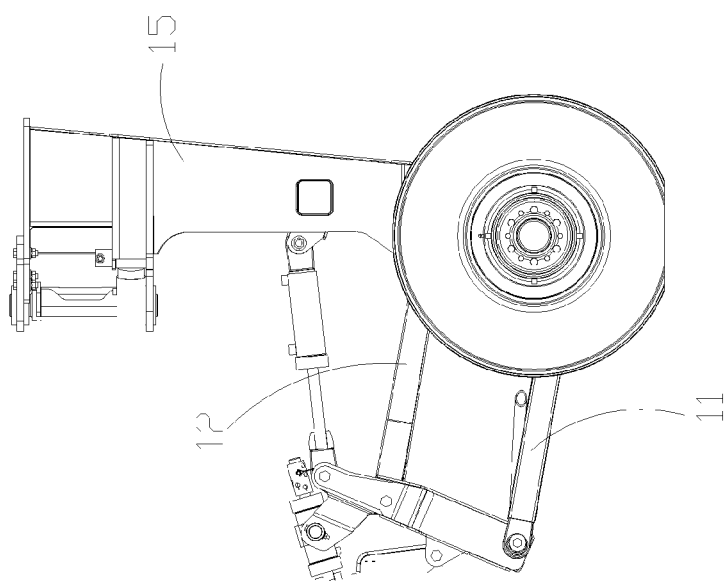
FIG. 3 is a left side elevation view of the rear of the mower showing the main frame mounted on wheels and indicating the parallelism of the two linkage levels.

Referring now to the drawings wherein like reference numerals indicate identical or corresponding parts throughout the several views, the present invention comprises a suspension system for an agricultural mower 1, shown in its entirety in FIGS. 1a, 1b, 6a, and 6b. The mower 1 comprises two integrated frames 10, 15. A tongue 2 extending over the machine is pivotally connected to a top of a main frame 15, positioned at the extreme rear of the agricultural mower 1. The main frame 15 has left and right legs mounted atop axles between two ground engaging wheels for supporting the agricultural mower 1 on the ground 65. The axis of rotation of these wheels is substantially perpendicular to a direction of travel. A sub-frame 10 is pivotally connected to the main frame 15, forward of the main frame 15 by means of a four-bar linkage system. The sub-frame 10 is a two part frame, suspending the work tool or cutter bar 9.

The tongue 2 is preferably connected to an agricultural tractor (not shown). The mower 1 is normally drawn in a direction toward the tongue 2, which direction is hereby defined as the forward direction. Based on this, the rearward direction is hereby defined for the purposes of this document, including the claims as opposite the forward direction.

A front of the mower 1 is likewise hereby defined as the general portion of the mower 1 in the lead as the mower 1 is drawn in the forward direction. A rear of the mower 1 is hereby defined as the general portion of the mower 1 seen when viewed from a side of the mower 1 opposite the tongue and facing in the forward direction.

A longitudinal direction is hereby defined as a direction parallel to the forward direction. A transverse direction is hereby defined as a direction perpendicular to the longitudinal direction, and parallel to an appropriate average of a slope of the ground surface in the vicinity of a header 6.

The above definitions are defined for the purposes of this document, including the claims.

The present invention comprises a four-bar linkage system including an upper set of linkages 12 and a lower set of linkages 11, each comprising two bars as illustrated in FIGS. 2-4 and 7-10. The upper linkage set 12 and the lower linkage set 11 are substantially parallel to one another when considering a side elevation view such as those featured in FIGS. 1a and 1b. As shown in the plan views of FIGS. 5a and 5b, and the rear elevation view, FIG. 7, the bars belonging to the upper linkage set 12 are oriented in such a way as to be angled with respect to a longitudinal axis 52 of the mower 1. More precisely, the upper links 12 are angled such that they connect to the sub-frame 10 at points nearer the longitudinal axis 52 than those points at which the upper links 12 connect to the main frame 15. The lower links 11 are angled such that they connect to the sub-frame 10 at points farther from the longitudinal axis 52 than those points at which the lower links 11 connect to the main frame 15.

Each independent bar of the lower linkage set 11 is pivotally connected to the main frame 15 by a spherical bearing, also known as a ball joint, at a first point and is pivotally connected to the sub-frame 10 by a spherical bearing, also known as a ball joint, at a second point.

Figure 7:
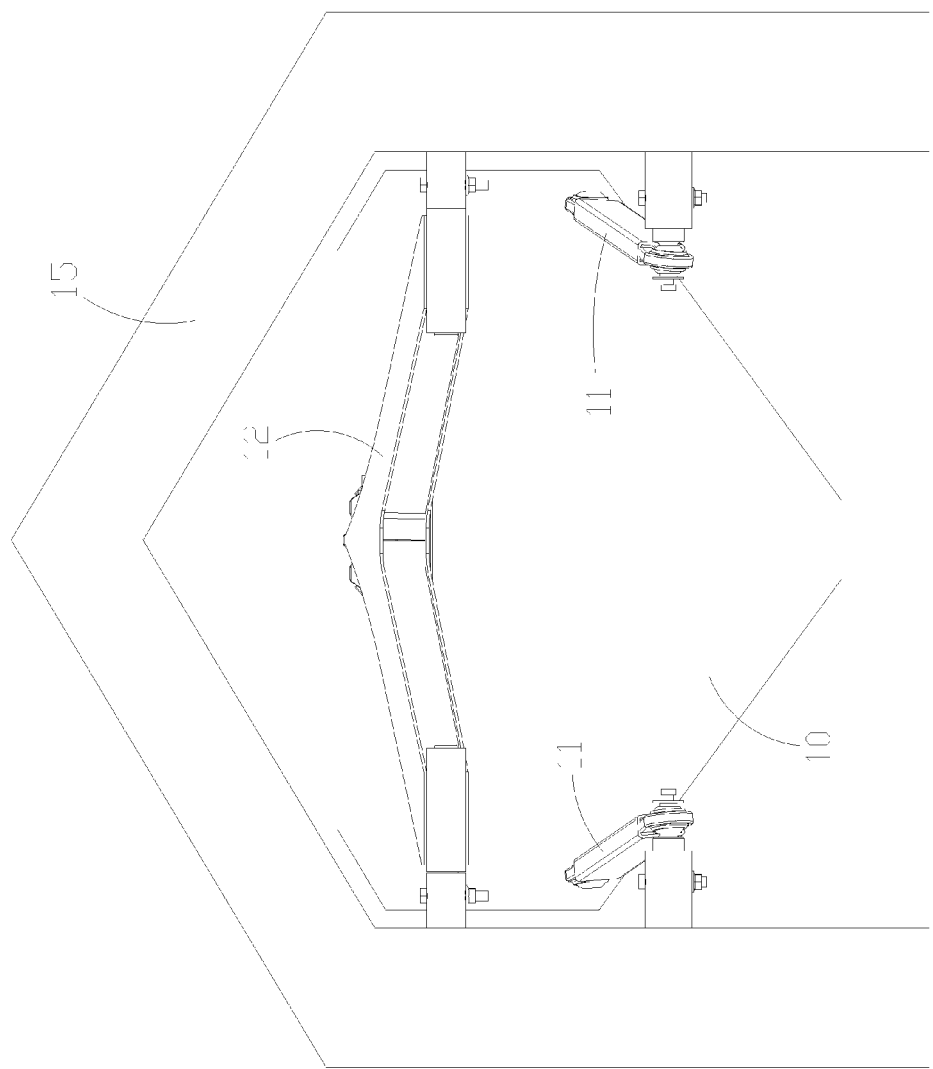
FIG. 7 is a rear elevation view of the mower in a first embodiment of the present invention.
Figure 8:
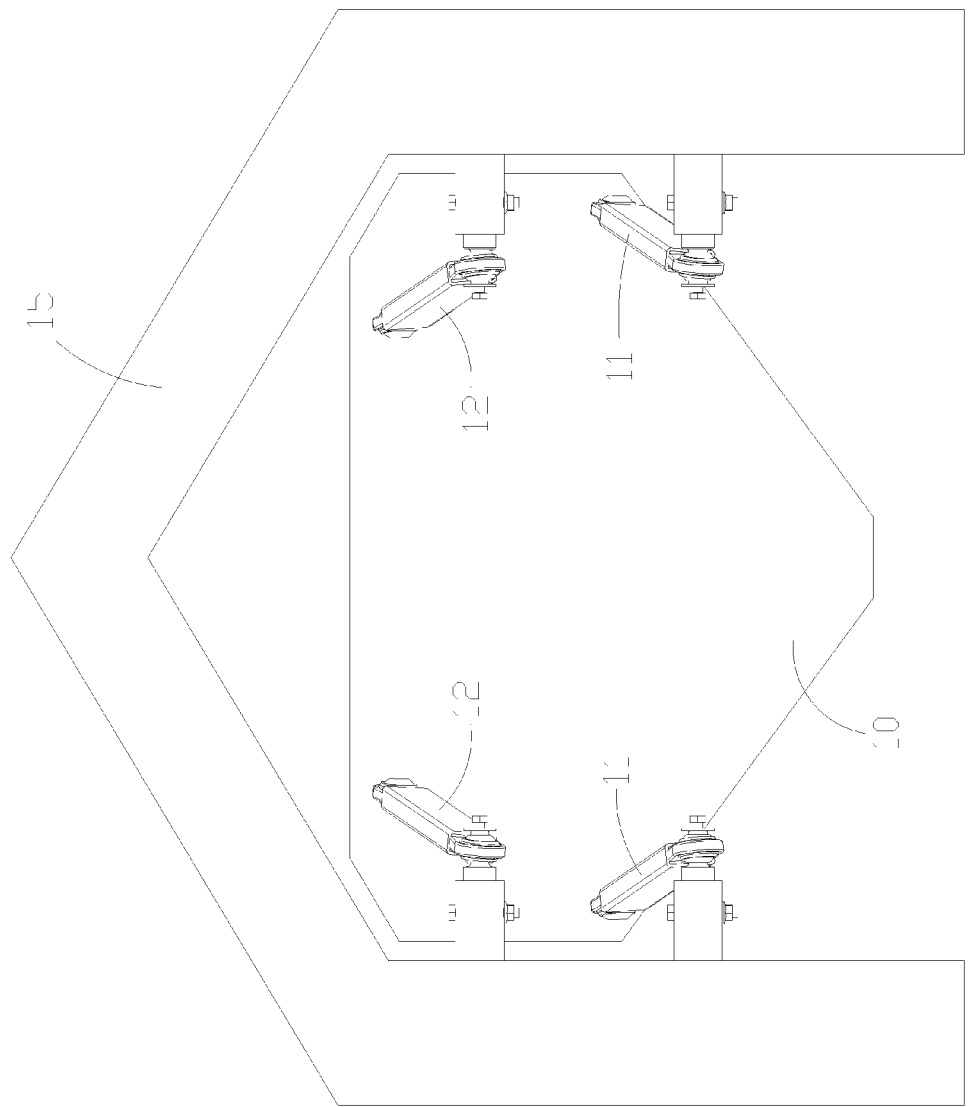
FIG. 8 is a rear elevation view of the mower in a second embodiment having individual links at a top of the four-bar linkage system.

As illustrated in FIGS. 7-10, each bar of the upper linkage 12 is pivotally connected to the main frame 15 by a cylindrical bearing at a first point and pivotally connected to the sub-frame 10 by a spherical bearing, also known as a ball joint, at a second point. In a first embodiment, the upper linkage bars 12 are rigidly affixed to one another where the upper linkage bars 12 converge at the sub-frame 10, and are connected to the sub-frame 10 with a single spherical bearing, as shown in FIG. 7. In a second embodiment, illustrated in FIG. 8, the two bars upper linkage bars 12 are not directly connected to one another, but are pivotally connected to the sub-frame 10 by independent spherical bearings in the same manner as the lower linkage bars 11. In this second embodiment, the ends of the upper linkage bars 12 nearest the sub-frame 10 are disposed closer together than their ends nearest the main frame 15. In either of the first and second embodiment, the lower linkage bars 11 diverge from one another as they extend from the main frame 15 to the sub-frame 10.

Figure 9:
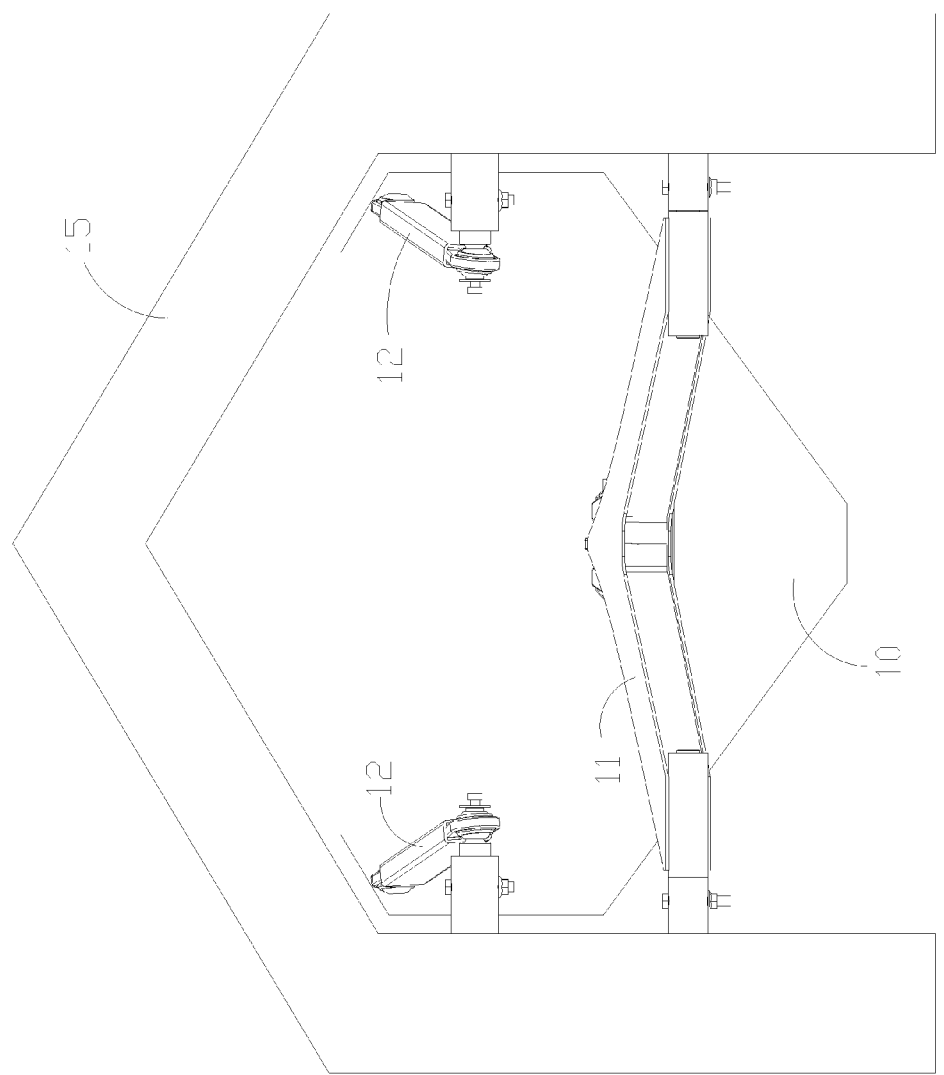
FIG. 9 is a rear elevation view of the mower presenting a third embodiment of the four-bar linkage system in which the orientations of the upper and lower linkage sets are opposite of those in the first embodiment.
Figure 10:
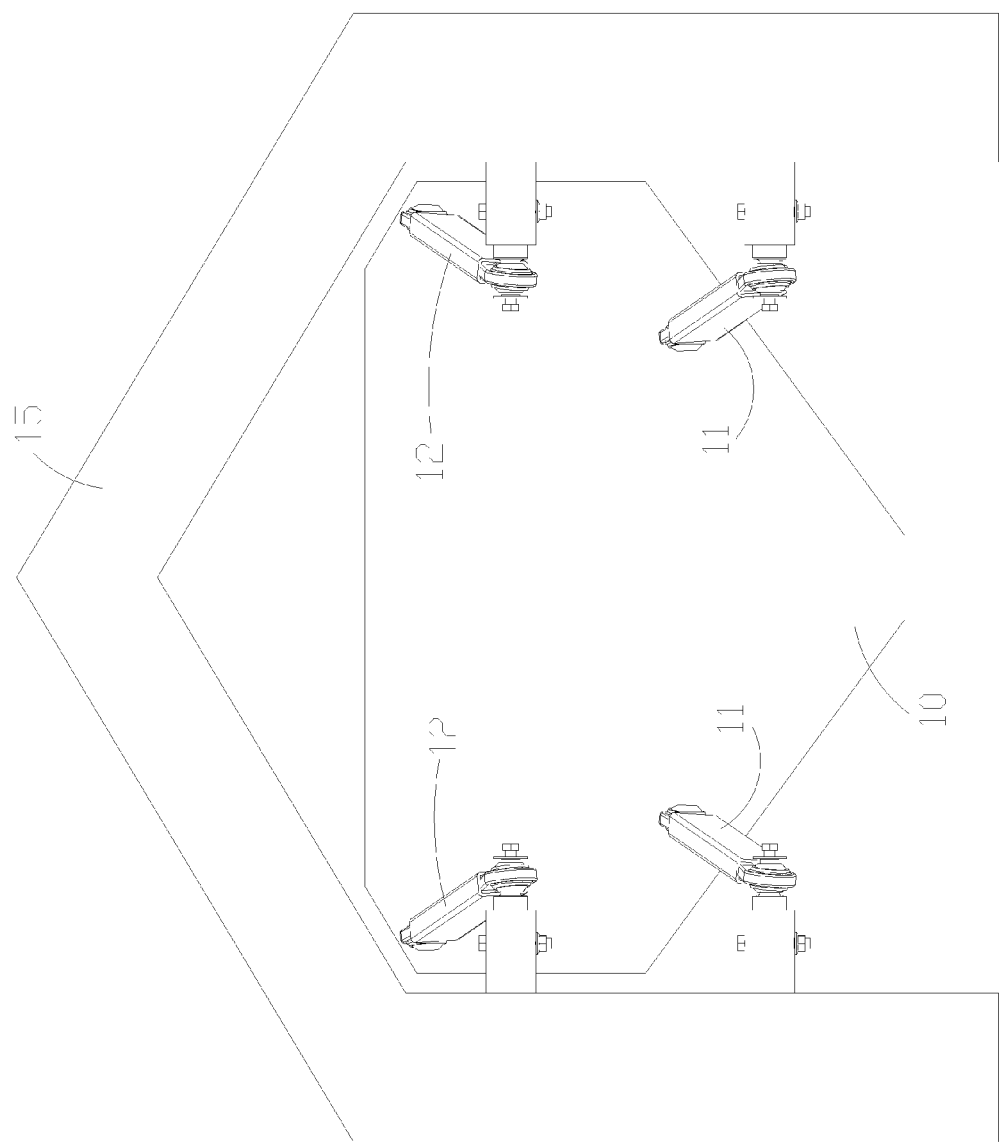
FIG. 10 is a rear elevation view of the mower presenting a fourth embodiment of the four-bar linkage system in which the orientations of the upper and lower linkage sets are opposite of those in the second embodiment.
Figure 11B:
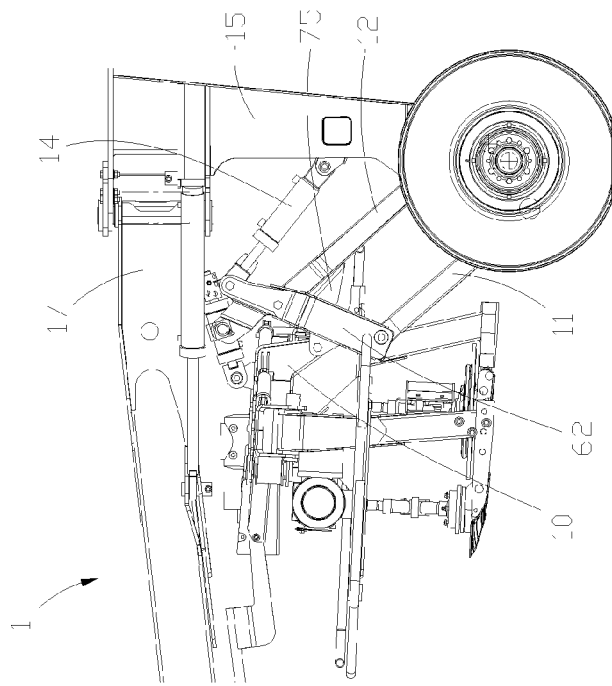
FIG. 11b is a side elevation view of the mower with its header in an operating position illustrating the leveling mechanism.
Figure 11A:
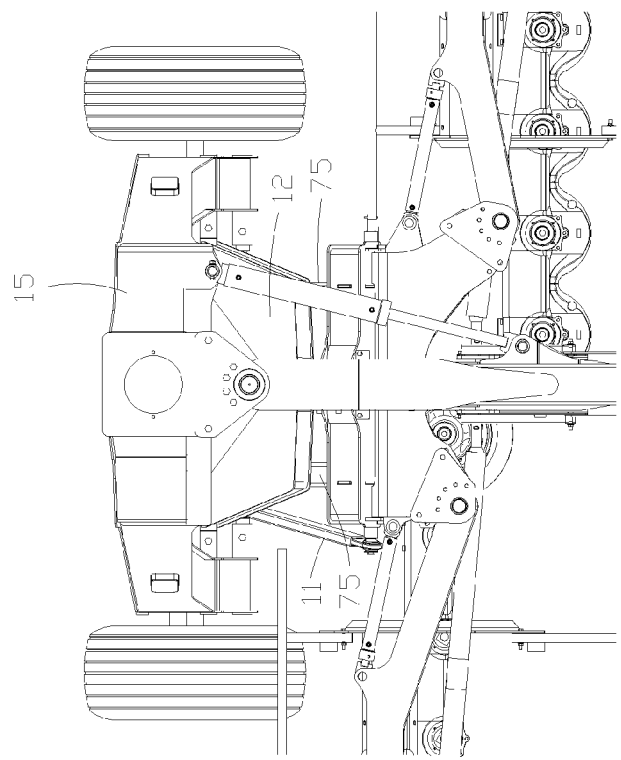
FIG. 11a is a top plan view of the mower with its header in an operating position illustrating a leveling mechanism.
Figure 12B:
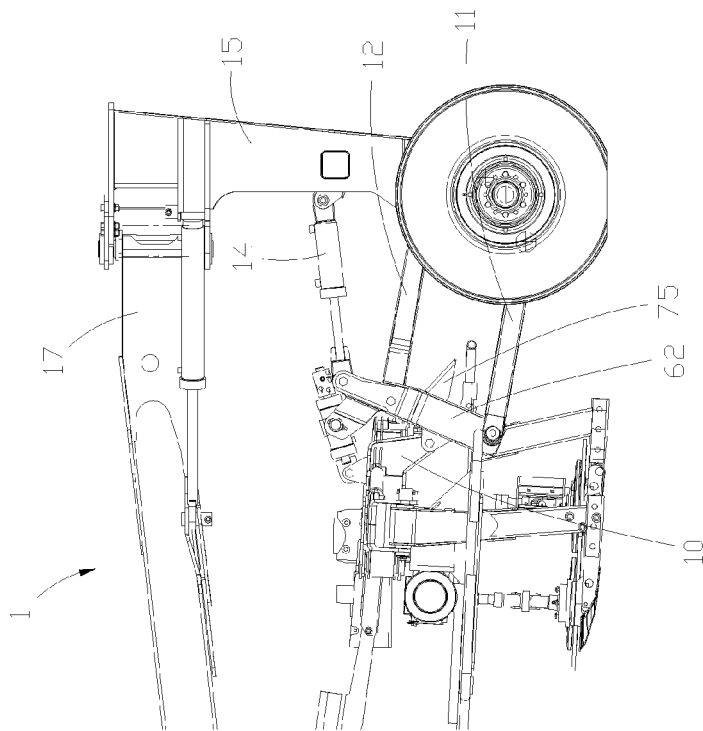
FIG. 12b is a side elevation view of the mower with its header in a transport position illustrating the leveling mechanism.
Figure 12A:
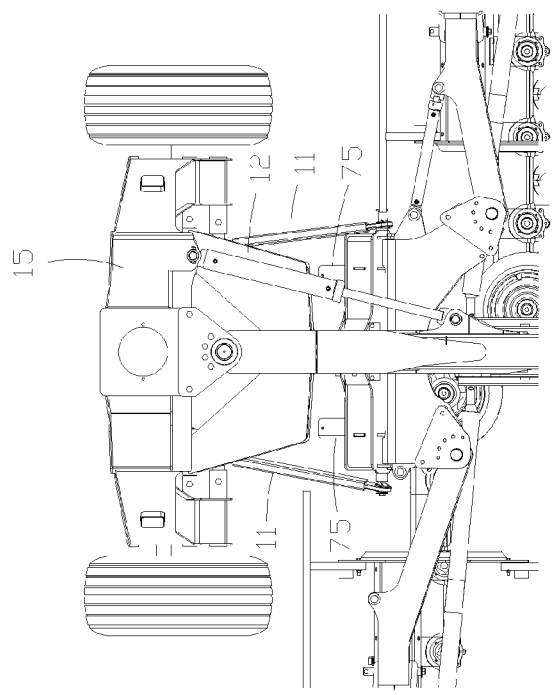
FIG. 12a is a top plan view of the mower with its header in a transport position illustrating the leveling mechanism.

In a third embodiment, the lower link arms 11 are rigidly affixed to one another where the lower linkage bars 11 converge at the sub-frame 10, and are connected to the sub-frame 10 with a single spherical bearing, as shown in FIG. 9. In a fourth embodiment, illustrated in FIG. 10, the two lower linkage bars 11 are not directly connected to one another, but are pivotally connected to the sub-frame 10 by independent spherical bearings in the same manner as the upper linkage bars 12. In this fourth embodiment, the ends of the lower linkage bars 11 nearest the sub-frame 10 are disposed closer together than their ends nearest the main frame 15. In either of the first and second embodiment, the upper linkage bars 12 diverge from one another as they extend from the main frame 15 to the sub-frame 10.

The linkage arrangement described above allows the sub-frame 10 to rotate about an axis of rotation parallel to the longitudinal axis 52. This ability is hereby defined as float for the purposed of this document, including the claims, and implies the capability of the mower 1 to adjust itself automatically to a ground slope perpendicular to the direction of travel. As illustrated especially in FIGS. 5a, 5b, 6a, and 6b, the two independent headers 6 are supported independently by their respective arms 8 on cylindrical bearings, allowing each cutter bar 9 to float independently. Therefore, the undersides of the cutter bars 9 engage the ground surface 65 with greater consistency due to their floating ability.

Figure 6B:
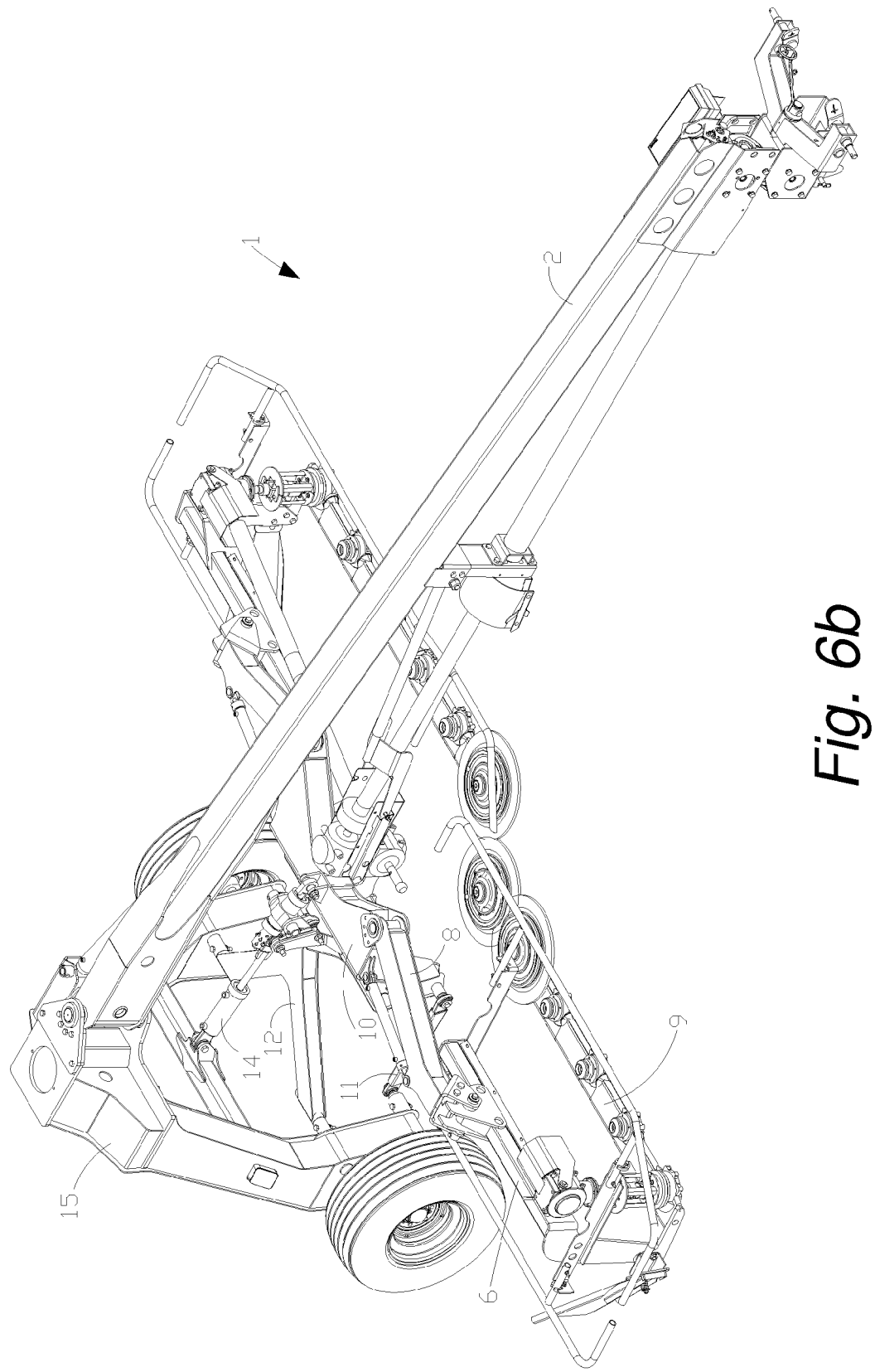
FIG. 6b is an isometric view of the mower in operational configuration.

The two arms 8, pivotally mounted to the top of the forward portion of the sub-frame 10, have a vertical axis of rotation. The cutter bars 9 mounted from these arms 8 are then allowed to pivot toward or away from the longitudinal axis 52. As shown in FIGS. 1a, 5a, and 6a, in a transport position, the arms 8 are rotated forward, thereby decreasing a width of the mower 1. In an operating mode, illustrated in FIGS. 1b, 5b and 6b, the arms 8 are rotated toward the rear of the mower 1 such that the two separate cutter bars 9 form a single row perpendicular to the direction of travel. The sub-frame lift cylinder 14 is used to raise the sub-frame 10 off the ground 65 for transport. The sub-frame 10 is provided with a locking arrangement for the transport position to eliminate the risk of the sub-frame 10 dropping to the ground 65 during transport.

The present invention realizes significant benefit in that the suspension system mounts the sub-frame 10 in such a way as to give the sub-frame 10 multi-directional motion freedoms such that the underside of the cutter bar 9 is allowed to more consistently engage the ground surface 65 as the ground surface 65 varies. This results in the benefit of a more consistent cut height.

Another significant benefit is realized by the converging and diverging arrangements of the lower linkage bars 11 and the upper linkage bars 12, in combination with the illustrated orientation sub-frame lift cylinder 14. Due to the lower linkage bars 11 being in tension whenever the sub-frame lift cylinder 14 is retracted, the header 6 is self-leveling when in the transport position, while the header 6 is permitted to be parallel to the ground when in the operating position. Further, due to the tension in the lower linkage bars 11, the header will tend to center itself relative to the main frame 15 on retraction of the sub-frame lift cylinder 14.

An additional leveling feature is illustrated in FIGS. 11a-12b. As the header is raised from the operating position (FIGS. 11a and 11b), to the transport position (FIGS. 12a and 12b), and the upper linkage bars 12 reach an extreme raised position, they make contact with a leveling bracket 75, causing the sub-frame 10, 62 to become parallel to the ground contour in the transverse direction. A benefit is that if one side of the header becomes heavy due to accumulation of crop material, etc., it will still become level. This also keeps the sub-frame 10 from swaying while the agricultural mower 1 is in its transport position.

The embodiments of the novel suspension system herein described may be utilized for any implement making use of a floating work tool. The invention is not intended to be limited to agricultural mowers.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

We claim:

1. A method of suspending a header from an agricultural implement to permit the header to float, the agricultural implement comprising a main frame, a sub-frame comprising a first side and a second side, and a four-bar linkage system comprising an upper link, a lower link, and an actuator, the method comprising:
   (a) operatively, pivotally attaching a first end of the upper link of the four-bar linkage system to the main frame of the agricultural implement using a first spherical bearing;
   (b) operatively, pivotally attaching a second end of the upper link to the first side of the sub-frame using a second spherical bearing;
   (c) operatively, pivotally attaching a first end of the lower link of the four-bar linkage system to the main frame using a first cylindrical bearing;
   (d) operatively, using a third spherical bearing to pivotally attach a second end of the lower link to the first side of the sub-frame in an orientation so that the lower link and upper link are not parallel;
   (e) operatively, pivotally attaching the actuator to the first side of the sub-frame for raising and lowering the sub-frame; and
   (f) operatively attaching the header of the agricultural implement to the second side of the sub-frame.

2. The method of claim 1 wherein operatively, pivotally attaching the second end of the upper link to the first side of the sub-frame comprises operatively, pivotally attaching the second end of the upper link to the rear side of the sub-frame.

3. The method of claim 2 wherein operatively attaching the header of the agricultural implement to the second side of the sub-frame comprises operatively attaching the header of the agricultural implement to the front side of the sub-frame.

4. The method of claim 1 wherein the lower link comprises a first lower link and the upper link comprises a first upper link, the agricultural implement additionally comprising a second lower link and a second upper link, the method additionally comprising:
   (a) operatively, pivotally attaching a first end of the second upper link to the main frame of the agricultural implement using a fourth spherical bearing;
   (b) operatively, pivotally attaching a second end of the second upper link to the sub-frame using a fifth spherical bearing;
   (c) operatively, pivotally attaching a first end of the second lower link to the main frame using a second cylindrical bearing; and
   (d) operatively, pivotally attaching a second end of the second lower link to the sub-frame using a sixth spherical bearing.

5. The method of claim 4 additionally comprising operatively, rigidly attaching the second end of the first lower link to the second end of the second lower link.

6. The method of claim 4 additionally comprising disposing the first end of the first upper link nearer the first end of the second upper link than the second end of the first upper link to the second end of the second upper link.

7. The method of claim 4 additionally comprising disposing the second end of the first lower link nearer the second end of the second lower link than the first end of the first lower link to the first end of the second lower link.

8. The method of claim 4 additionally comprising disposing the first end of the first lower link nearer the first end of the second lower link than the second end of the first lower link to the second end of the second lower link.

9. The method of claim 4 additionally comprising disposing the second end of the first upper link nearer the second end of the second upper link than the first end of the first upper link to the first end of the second upper link.

10. The method of claim 1 wherein the header comprises a first header section and a second header section, the method comprising:
   (a) suspending the first header section from the first cylindrical bearing;
   (b) disposing an axis of rotation of the first cylindrical bearing substantially parallel to a longitudinal direction of the agricultural implement;
   (c) suspending the second header section from a second cylindrical bearing;
   (d) disposing an axis of rotation of the second cylindrical bearing substantially parallel to a longitudinal direction of the agricultural implement; and
   (e) permitting the first header section to pivot on the first cylindrical bearing independently of the pivoting of the second header section on the second cylindrical bearing.

11. The method of claim 1 wherein the four bar linkage system is not an integral part of an agricultural tractor.

12. An agricultural implement comprising:
   (a) a left side;
   (b) a right side;
   (c) a main frame;
   (d) a longitudinal axis substantially parallel to a forward direction;
   (e) a sub-frame;
   (f) a left upper link having a first end operatively, pivotally connected to the main frame by a first spherical bearing; and a second end operatively, pivotally connected to the sub-frame by a second spherical bearing;
   (g) a four-bar linkage comprising:
      a right upper link having a first end operatively, pivotally connected to the main frame by a third spherical bearing, and a second end operatively, pivotally connected to the sub-frame by a fourth spherical bearing;
      a lower link having a first end operatively, pivotally connected to the main frame by a cylindrical bearing, and a second end operatively pivotally connected to the sub-frame by a fifth spherical bearing, the lower link being non-parallel to the right and left upper links;
   (h) an actuator, operatively, pivotally connected to the sub-frame for raising and lowering the subframe; and
   (i) a work tool, operatively attached to the sub-frame that supports the work tool.

13. The agricultural implement of claim 12 wherein the lower link comprises a left lower link, the agricultural implement additionally comprising a right lower link having a first end operatively, pivotally connected to the main frame by a second cylindrical bearing, and a second end operatively, pivotally connected to the sub-frame by a sixth spherical bearing, both the left lower link and right lower link being non-parallel to both of the left and right upper links.

14. The agricultural implement of claim 13 wherein the second end of the left lower link is operatively, rigidly affixed to the second end of the right lower link.

15. The agricultural implement of claim 12 wherein the first end of the left upper link and the first end of the right upper link are disposed nearer to one another than the second end of the left upper link and the second end of the right upper link.

16. The agricultural implement of claim 12 wherein the first end of the left upper link and the first end of the right upper link are disposed farther apart relative to one another than the second end of the left upper link and the second end of the right upper link.

17. The agricultural implement of claim 13 wherein the first end of the left lower link and the first end of the right lower link are disposed nearer to one another than the second end of the left lower link and the second end of the right lower link.

18. The agricultural implement of claim 13 wherein the first end of the left lower link and the first end of the right lower link are disposed farther apart relative to one another than the second end of the left lower link and the second end of the right lower link.

19. The agricultural implement of claim 12 additionally comprising a tongue, operatively, pivotally connected to the main frame.

20. The agricultural implement of claim 12 wherein the sub-frame is disposed in front of the main frame.

21. The agricultural implement of claim 12 wherein the left upper link and lower link are substantially parallel when viewed from a transverse direction.

22. The agricultural implement of claim 12 additionally comprising:
   (a) an actuator attachment point disposed to a first side of the sub-frame and whereby the actuator is operatively, pivotally connected to the sub-frame; and
   (b) a work tool attachment point disposed to a second side of the sub-frame and whereby the work tool is operatively attached to the sub-frame.

23. The agricultural implement of claim 22 where in the first side of the sub-frame comprises the rear side of the sub-frame.

24. The agricultural implement of claim 22 where in the second side of the sub-frame comprises the front side of the sub-frame.

25. The agricultural implement of claim 12 wherein the four bar linkage is not an integral part of an agricultural tractor.

26. An agricultural implement comprising:
   (a) a main frame having a front, a left side, a right side and a longitudinal axis substantially parallel to a forward direction;
   (b) a two-component sub-frame for supporting a work tool wherein a first component of the sub-frame is operatively, pivotally connected to the main frame via a four-bar linkage, and a second component of the sub-frame is operatively, pivotally connected to the work tool;
   (c) a left upper link having a first end operatively, pivotally connected to the main frame by a first spherical bearing; and a second end operatively, pivotally connected to the sub-frame by a second spherical bearing;
   (d) a right upper link having a first end operatively, pivotally connected to the main frame by a third spherical bearing, and a second end operatively, pivotally connected to the sub-frame by a fourth spherical bearing; and
   (e) a lower link having a first end operatively, pivotally connected to the main frame by a cylindrical bearing, and a second end operatively pivotally connected to the sub-frame by a fifth spherical bearing;
   (f) the left and right upper links being non-parallel to the lower link; and (g) an actuator connected to the sub-frame for raising and lowering the sub-frame.

27. The agricultural implement of claim 26 wherein the lower link comprises a left lower link, the agricultural implement additionally comprising a right lower link having a first end operatively, pivotally connected to the main frame by a second cylindrical bearing, and a second end operatively, pivotally connected to the sub-frame by a sixth spherical bearing.

28. The agricultural implement of claim 27 wherein the second end of the left lower link is operatively, rigidly affixed to the second end of the right lower link.

29. The agricultural implement of claim 26 wherein the four bar linkage is not an integral part of an agricultural tractor.

* * * * *